(12) United States Patent
Khan et al.

(10) Patent No.: US 7,636,858 B2
(45) Date of Patent: Dec. 22, 2009

(54) MANAGEMENT OF A TRUSTED CRYPTOGRAPHIC PROCESSOR

(75) Inventors: Moinul H Khan, Austin, TX (US);
Anitha Kona, Austin, TX (US)

(73) Assignee: Intel Corporation, Santa Clara, CA (US)

( * ) Notice: Subject to any disclaimer, the term of this patent is extended or adjusted under 35 U.S.C. 154(b) by 1048 days.

(21) Appl. No.: 10/881,005

(22) Filed: Jun. 30, 2004

(65) Prior Publication Data

US 2009/0282261 A1 Nov. 12, 2009

Related U.S. Application Data

(60) Provisional application No. 60/528,890, filed on Dec. 11, 2003.

(51) Int. Cl.
*G06F 21/00* (2006.01)
*G06F 21/06* (2006.01)
*G06F 21/02* (2006.01)

(52) U.S. Cl. ................ 713/189; 713/172; 713/188; 713/187; 726/26; 726/34; 726/35; 726/36

(58) Field of Classification Search ............... None
See application file for complete search history.

(56) References Cited

U.S. PATENT DOCUMENTS 6,085,090 A * 7/2000 Yee et al. .............. 455/440
6,766,455 B1 * 7/2004 Ryan, Jr. ............... 713/189
2003/0120944 A1 * 6/2003 Kim et al. .............. 713/193
2004/0039928 A1 * 2/2004 Elbe et al. .............. 713/189
2005/0132186 A1 6/2005 Khan et al.
2005/0132226 A1 6/2005 Wheeler et al.
2005/0240782 A1 * 10/2005 Hubert .................. 713/300
2006/0072755 A1 * 4/2006 Oskari .................. 380/270
2006/0226243 A1 * 10/2006 Dariel .................. 235/492

FOREIGN PATENT DOCUMENTS

EP 0534419 A2 3/1993
WO WO 2005/060151 A2 6/2005

OTHER PUBLICATIONS

Jones, R. W., "User Functions for the Generation and Distribution of Encipherment Keys", *ICL Technical Journal*, 4 (2), (Nov. 1984), 146-158.

* cited by examiner

*Primary Examiner*—Syed A. Zia
(74) *Attorney, Agent, or Firm*—Schwegman, Lundberg & Woessner, P.A.

(57) ABSTRACT

In an embodiment, an apparatus includes a trusted cryptographic processor that includes at least one functional unit. The trusted cryptographic processor also includes a controller to receive a primitive instruction that identifies which of the at least one functional unit is to perform an operation, wherein the controller is to reduce power to the at least one functional unit that is not identified by the primitive instruction. The apparatus includes a trusted power management unit to supply the power based on control from the controller, wherein the control is independent of a processor that is not in a trusted state.

22 Claims, 8 Drawing Sheets

MANAGEMENT OF A TRUSTED CRYPTOGRAPHIC PROCESSOR

RELATED APPLICATION

This application claims the benefit of priority under 35 U.S.C. 119(e) to U.S. Provisional Patent Application Ser. No. 60/528,890, entitled Trusted Mobile Platform Architecture, filed Dec. 11, 2003, the entire specification of which is hereby incorporated by reference. This application is related to pending U.S. patent application Ser. No. 10/815,461, entitled "Method and Apparatus for a Trust Processor", filed on Mar. 31, 2004, and to pending U.S. patent application Ser. No. 10/815,454, entitled "Trusted Mobil Platform Architecture", filed on Mar. 31, 2004, which are both assigned to the assignee of the embodiments disclosed herein, Intel Corporation.

TECHNICAL FIELD

This inventive subject matter relates generally to electronic data processing, and more particularly, to management of a trusted cryptographic processor.

BACKGROUND

Wireless mobile devices (such as cellular telephones, personal digital assistants (PDAs), etc.) are typically small in size, untethered and are therefore easy to lose. As easy as they are to lose, such devices are just as easy to steal. Because of the propensity to be stolen, these devices are susceptible to tampering. Moreover, the minimalist approach to building a low-power device often makes these embedded systems simplistic (in terms of operating system and hardware), which in turn makes them susceptible in the hands of a malicious user and/or application. Users are depending on these devices for more diverse and potentially valuable uses. In particular, within such devices, users are storing confidential information, such as receipts, credit card numbers, addresses, telephone numbers, confidential documents, etc. Accordingly, these devices are increasingly become a prime target for thieves because of the ease with which they can be attacked. Thus, there are needs to ensure the integrity of these devices, including the application and data stored therein.

BRIEF DESCRIPTION OF THE DRAWINGS

Embodiments of the invention may be best understood by referring to the following description and accompanying drawings that illustrate such embodiments. The numbering scheme for the Figures included herein is such that the leading number for a given reference number in a Figure is associated with the number of the Figure. For example, a trusted mobile computing device 100 can be located in FIG. 1A. However, reference numbers are the same for those elements that are the same across different Figures. In the drawings.

DETAILED DESCRIPTION

Methods, apparatus and systems for power management in a trusted mobile platform architecture are described. In the following description, numerous specific details are set forth. However, it is understood that embodiments of the invention may be practiced without these specific details. In other instances, well-known circuits, structures and techniques have not been shown in detail in order not to obscure the understanding of this description.

This detailed description is divided into three sections. In the first section, a hardware architecture is presented. In the second section, trusted and cryptographic operations are described. In the third section, a system operating environment is described.

Hardware Architecture

Figure 1A:
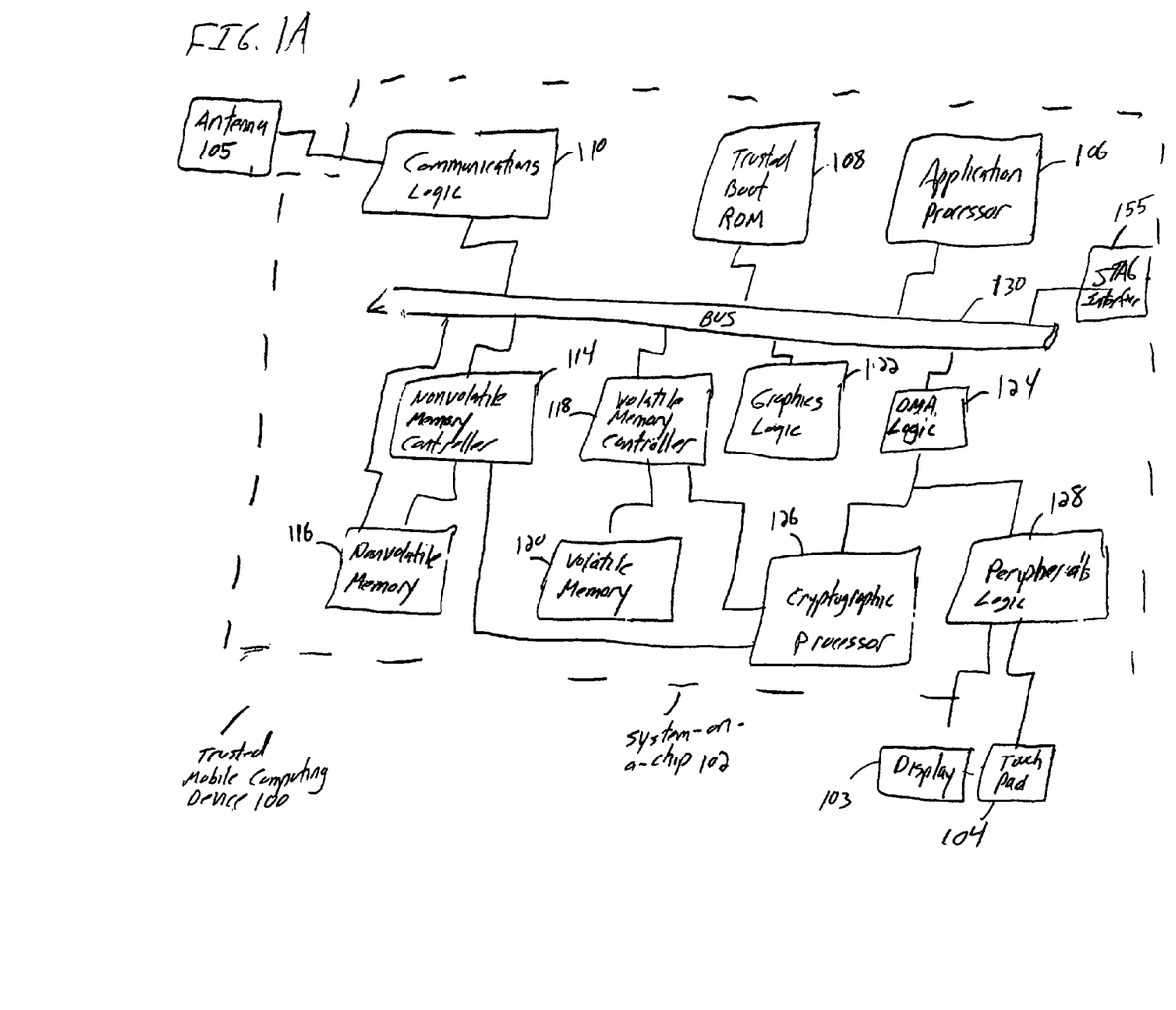
FIGS. 1A-1B illustrate simplified functional block diagrams of a mobile computing device having a trusted platform architecture, according to some embodiments of the invention.
Figure 1B:
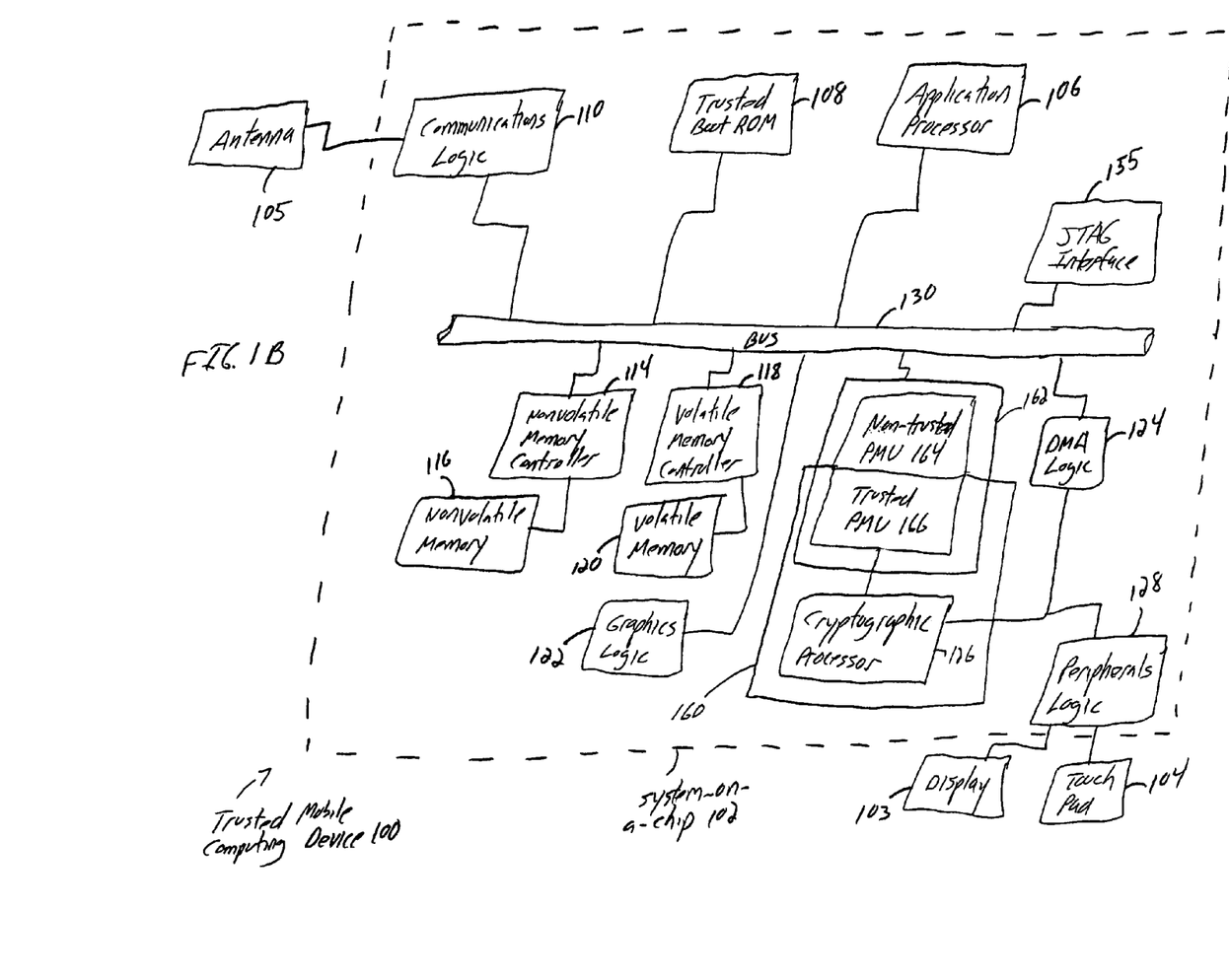

FIGS. 1A-1B illustrate simplified functional block diagrams of a mobile computing device having a trusted platform architecture, according to some embodiments of the invention. In particular, FIGS. 1A-1B illustrate a trusted mobile computing device 100, which may be representative of a number of different types of mobile computing devices (such as a cellular telephone, a PDA, etc.). As further described below, in addition to the components illustrated in FIG. 1A, FIG. 1B also includes a power management unit (PMU) 162.

The trusted mobile computing device 100 includes a system-on-a-chip 102, a display 103, a touch pad 104 and an antenna 105, which are coupled together. The display may be any of a number of viewing devices, such as a Liquid Crystal Display (LCD) screen, etc. The touch pad 104 may be used to receive input from the user of the trusted mobile computing device 100. For example, the touch pad 104 may be a numeric touch pad, a keyboard, etc. Although not shown, the trusted mobile computing device 100 may include a number of other peripherals, such as audio Input/Output (I/O) logic, etc. for the input and output of audio data from the user.

The system-on-a-chip 102 may be a single chip wherein the components described herein are fabricated on a same semiconductor substrate. Alternatively, the system-on-a-chip 102 may be a number of such chips that are epoxied together.

The system-on-a-chip 102 includes an application processor 106, a trusted boot read only memory (ROM) 108, a communications logic 110, a nonvolatile memory controller 114, a nonvolatile memory 116, a volatile memory controller 118, a volatile memory 120, a graphics logic 122, a direct memory access (DMA) logic 124, a cryptographic processor 126, a peripheral logic 128, a Joint Test Access Group (JTAG) interface 155 and a bus 130. The application processor 106, the trusted boot ROM 108, the communications logic 110, the nonvolatile memory controller 114, the nonvolatile memory 116, the volatile memory controller 118, the graphics logic 122, the JTAG interface 155 and the DMA logic 124 are coupled to the bus 130. Accordingly, the bus 130 provides communications among such components. The display 103 and the touchpad 104 are coupled to the system-on-a-chip 102 through the peripheral logic 128.

The antenna 105 is coupled to the communications logic 110. The communications logic 110 provides for the receipt and transmission of I/O into and out from the trusted mobile computing device 100. For example, the communications logic 110 may receive and transmit wireless communications into and out from the trusted mobile computing device 100 using the antenna 105. The antenna 105 may be a patch, monopole, dipole, beam, array, or directional antenna, among others. As further described below, the antenna 105 may receive communications that cause the application processor 106 to generate one or more primitive instructions for a cryptographic operation. Additionally, the antenna 105 may output communications-related cryptographic operations performed by the cryptographic processor 126.

Such primitive instructions may be transmitted to the cryptographic processor 126 for execution. In some embodiments, the application processor 106 may generate primitive instructions that include an occupancy tag. As further described below, this occupancy tag may identify which of the number of functional units in the cryptographic processor 126 are to perform an operation based on the primitive instruction. In some embodiments, the application processor 106 may generate this occupancy tag at the time of compilation of the primitive instructions.

In some embodiments, the communications logic 110 may include a baseband processor (a digital signal processor, for example) that establishes the particular communication standard for the trusted mobile computing device 100. The communications logic 110 may be a wireless interface. For example, if the trusted mobile computing device 100 is a cellular telephone, then the communications logic 110 provides a cellular network interface, a wireless interface, for the trusted mobile computing device 100. For this wireless interface, the baseband processor may establish a code division multiple access (CDMA) cellular radiotelephone communication system, or a wide-band CDMA (W-CDMA) radiotelephone communication system, as just a few examples. The W-CDMA specifically has been proposed as a solution to third generation ("3G") systems by the European Telecommunications Standards Institute (ETSI) as their proposal to the International Telecommunication Union (ITU) for International Mobile Telecommunications (IMT)-2000 for Future Public Land Mobile Telecommunications Systems (FPLMTS). The baseband processor may establish other telecommunication standards such as Global System for Mobile (GSM) Communication, ETSI, Version 5.0.0 (December 1995); or General Packet Radio Service (GPRS) (GSM 02.60, version 6.1), ETSI, 1997.

The trusted boot ROM 108 stores code that is executed by the application processor 106 prior to transferring control to an operating system to be executed in the application processor 106. As further described below, such code causes the execution of a number of trusted operations (using the cryptographic processor 126) to ensure the integrity of the operating system. A more detailed description of the trusted boot operations is described in the following co-pending, commonly assigned U.S. patent application entitled "Securing an Electronic Device", Ser. No. 10/745,469 filed on Dec. 22, 2003. The JTAG interface 155 provides a debugging interface into the trusted mobile computing device 100.

The nonvolatile memory 116 may be any of a number of different types of nonvolatile writable memories, such as a flash memory, etc. The volatile memory 120 may be any of a number of different types of volatile writeable memories, such as Random Access Memory (RAM) (e.g., Synchronous Dynamic RAM (SDRAM), DRAM, Double Data Rate (DDR)-SDRAM, etc.), etc.

The nonvolatile memory controller 114 is coupled to the nonvolatile memory 116. The volatile memory controller 118 is coupled to the volatile memory 120. Accordingly, components coupled to the bus 130 may communicate with the nonvolatile memory 116 and the volatile memory 120 through the nonvolatile memory controller 114 and the volatile memory controller 118, respectively. The cryptographic processor 126 and the peripheral logic 128 are coupled to the bus 130 through the DMA logic 124. Components coupled to the bus 130 may communicate with the cryptographic processor 126 and the peripheral logic 128 through the DMA logic 124.

The cryptographic processor 126 is also coupled directly, through private interfaces, to the nonvolatile memory 116 and the volatile memory 120 through the nonvolatile memory controller 114 and the volatile memory controller 118, respectively. As shown, other components in the trusted computing device 100 (such as the application processor 106) may not access the nonvolatile memory 116 and the volatile memory 120 through these private interfaces. Additionally, the cryptographic processor 126 and the application processor 106 may access the nonvolatile memory 116 and the volatile memory 120 through the bus 130 (public interfaces).

The cryptographic processor 126 may partition the volatile memory 120 into at least two different sections (a public section and a private section). Accordingly, only the cryptographic processor 126 may access the address space within the private section of the volatile memory 120. Additionally, the different components in the trusted mobile computing device 100 may access the address space within the public section of the volatile memory 120. Such a configuration allows the private section to be used for secure/trusted use and precludes the application processor 106 from accessing this section. Therefore, if a virus and/or malicious code were to be executing on the application processor 106, such code may not corrupt the private section of the volatile memory 120. Accordingly, the cryptographic processor 126 may use this private section for secure storage of encrypted cryptographic keys, etc. to be used in the operations performed therein.

As further described below, the cryptographic processor 126 comprises protected storage and a number of different functional units. The cryptographic processor 126 may provide for authentication of software, hardware, configuration data, etc. associated with or executing within the trusted mobile computing device 100. For example, as part of the initialization of the trusted mobile computing device 100, the cryptographic processor 126 may perform a cryptographic hash across the code of an application and compare this hash to a signed credential that is securely stored in the trusted mobile computing device 100. Additionally, the cryptographic processor 126 also provides for different cryptographic operations during operation of the trusted mobile computing device 100. For example, the cryptographic processor 126 may generate cryptographic keys, perform different types of encryption and decryption, generate hashes, digital signatures, etc.

The application processor 106 may be in a first operating context, while the cryptographic processor 126 may be in a second operating context. The first operating context and the second operating context may be independent of each other.

As further described below, the application processor 106 may execute a driver (for the cryptographic processor 126) that provides the interface between applications executing on the application processor 106 and the cryptographic processor 126 (through the DMA logic 124). This driver receives requests for different security services (authentication, trust, encryption, decryption, etc.) from the operating system controlling the application processor 106. The driver may generate one or more primitive instructions based upon a security service request. These primitive instructions are then issued to the cryptographic processor 126 for execution. Moreover, the cryptographic processor 126 may retrieve data (from the nonvolatile memory 116 and/or the volatile memory 120 through the DMA logic 124) on which execution is performed based on the primitive instruction. The cryptographic processor 126 may execute a cryptographic operation on the retrieved data based on the primitive instruction.

With regard to FIG. 1B, in addition to the components illustrated in FIG. 1A, the system-on-a-chip 102 also includes the PMU 162 that includes a non-trusted PMU 164 and a trusted PMU 166. A trusted unit 160 includes the cryptographic processor 126 and the trusted PMU 166. As further described below, the trusted PMU 166 may supply power to the cryptographic processor 126 (independent of the non-trusted PMU 164).

In some embodiments, a controller within the cryptographic processor 126 may control the trusted PMU 166. The non-trusted PMU 164 may supply power to the other units of the trusted mobile computing device 100 (not including the cryptographic processor 126). A more detailed description of the operations of the trusted mobile computing device 100 is set forth below in conjunction with the flow diagrams in FIGS. 4, 5, 6A-6B.

Figure 2:
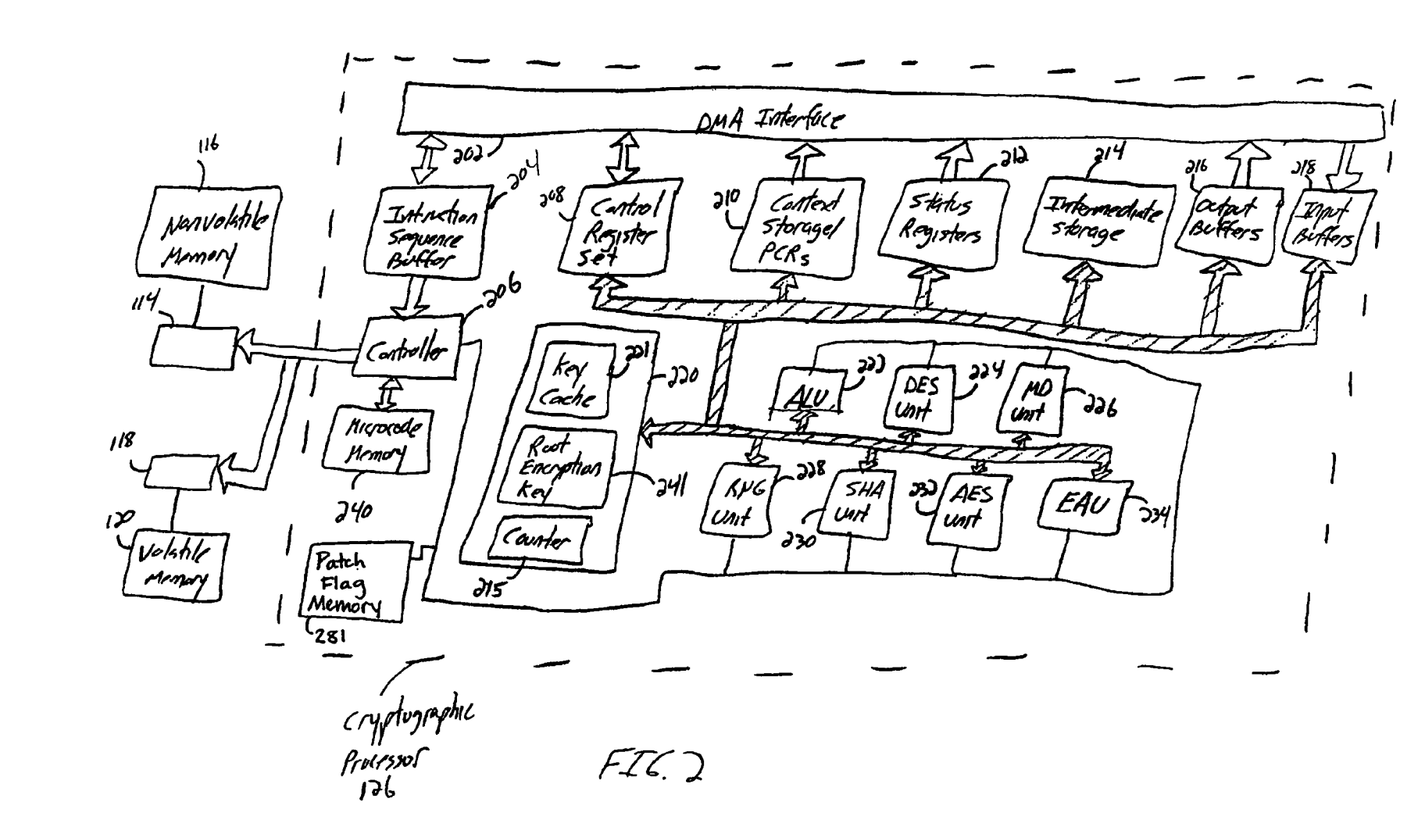
FIG. 2 illustrates a simplified functional block diagram of a cryptographic processor within a trusted mobile computing device, according to some embodiments of the invention.

FIG. 2 illustrates a simplified functional block diagram of a cryptographic processor within a trusted mobile computing device, according to some embodiments of the invention. In particular, FIG. 2 illustrates a more detailed block diagram of an embodiment of the cryptographic processor 126.

The cryptographic processor 126 includes a DMA interface 202, an instruction sequence buffer 204, a controller 206, a microcode memory 240, a patch flag memory 281, a control register set 208, context storage/platform configuration registers 210, status registers 212, intermediate storage 214, output buffers 216, input buffers 218, an internal volatile memory 220, an arithmetic logic unit (ALU) 222, a data encryption standard (DES) unit 224, a message digest (MD) unit 226, a random number generator (RNG) unit 228, a secure hash algorithm (SHA) unit 230, an advanced encryption standard (AES) unit 232 and an exponential arithmetic unit 234. Thus, the cryptographic processor 126 includes a number of different functional units (including a number of different cryptographic units) (the ALU 222, the DES unit 224, the MD unit 226, the RNG unit 228, the SHA unit 230, the AES unit 232 and the exponential arithmetic unit 234).

While the microcode memory 240 may be different types of memories, in an embodiment, the microcode memory 240 is a read only memory (ROM). The internal volatile memory 220 may be any of a number of different types of volatile writeable memories, such as Random Access Memory (RAM) (e.g., Synchronous Dynamic RAM (SDRAM), DRAM, DDR-SDRAM, etc.), etc. As shown, the internal volatile memory 220 stores a key cache 221, a root encryption key 241 and a counter 215. The key cache 221 may store a number of different protected keys, which may be data encryption keys and/or key encryption keys (used to encrypt data encryption keys). An embodiment of the key cache 221 is described in more detail below in conjunction with FIG. 3.

The patch flag memory 281 may be any of a number of different types of volatile writeable memories, such as Random Access Memory (RAM) (e.g., Synchronous Dynamic RAM (SDRAM), DRAM, DDR-SDRAM, etc.), etc. As further described below, the patch flag memory 281 may store patch flags that correspond to segments in the microcode memory 240. A given patch flag is indicative as to whether a given segment of the microcode memory 240 has been patched. A more detailed description of the use of the patch flags is provided below.

The DMA interface 202 is coupled to receive and transmit data into and out from the cryptographic processor 126. The DMA interface 202 is coupled to the instruction sequence buffer 204, the control register set 208, the context storage/PCRs 210, the status registers 212, the output buffers 216 and the input buffers 218.

The instruction sequence buffer 204 stores primitive instructions received from the application processor 106 (FIGS. 1A-1B). The controller 206 may retrieve a given primitive instruction from the instruction sequence buffer 204 and retrieve the associated microcode instruction(s) from the microcode memory 240. These microcode instructions may include a series of operations to be performed within the cryptographic processor 126. For example, one instruction may cause the controller 206 to retrieve an encrypted data encryption key from the volatile memory 120. A different instruction may cause the controller 206 to transmit this key to one of the functional units for decryption. Another instruction may cause the decrypted data encryption key to be transmitted to a different functional unit to perform a cryptographic operation. The output from this series of microcode instructions may be stored into the output buffers 216. The driver (for the cryptographic processor 126) may then retrieve this output. A more detailed description of such operations is set forth below.

In some embodiments, the controller 206 may control the trusted PMU 166 (shown in FIGS. 1A-1B). The controller 206 may regulate the power and/or the clock speed of the different functional units based on whether such units are to perform an operation for the given primitive instruction. The controller 206 may cause the trusted PMU 166 to modify the power, the voltage, the clock frequency, etc. that is being input into the cryptographic processor 126. As further described below, the controller 206 may regulate the clock rate, the power, etc. for an individual functional unit within the cryptographic processor 126. For example, the controller 206 may cause the trusted PMU 166 to lower the clock rate or the power for a given functional unit if such functional unit is not in operation for a given primitive instruction. In some embodiments, the controller 206 may shut off the clock signal and/or the power to a given functional unit if such functional unit is not in operation for a given primitive instruction. In some embodiments, the controller 206 may cause the trusted PMU 166 to shut off power for the cryptographic processor 126 if the cryptographic processor 126 is inactive for a predetermined period (i.e., a predetermined period of inactivity).

As described, some embodiments of the invention regulate the clock rate and the power for a trusted cryptographic processor using a power management unit that is controlled by the trusted cryptographic processor (and not by the application processor 106). Accordingly, for a system-on-a-chip that includes both an application processor and a trusted cryptographic processor that are fabricated on a same substrate, power management is separated to ensure that the control of the power to the trusted cryptographic processor is not compromised. For example, an application executing on the application processor 106 is not allowed access to the control of the power for the cryptographic processor 126.

The SHA unit 230 may be used to generate and validate cryptographic hashes. The SHA unit 230 may perform SHA-1 operations and HMAC calculations based on SHA. The exponential arithmetic unit 234 may be used to perform acceleration of a number of different arithmetic operations. For example, the exponential arithmetic unit 234 may be used to perform asymmetric encryption and decryption, signing, verification of a signature, etc. for different types of encryption standards (such as the Rivest, Shaman and Adelman (RSA)). To illustrate, the exponential arithmetic unit 234 may perform modular exponentiation, modular reduction, multiplication, addition, subtraction, etc.

The AES unit 232 may perform a number of different types of encryptions (e.g., symmetric, asymmetric). The AES unit 232 may perform encryption based on a variable number of rounds that is dependent on the encryption key length. For example, AES unit 232 may support key lengths of 128-bit, 192-bit and 256-bit, which result in 10, 12 and 14 rounds, respectively. The AES unit 232 may be used to encrypt data encryption keys with a different key, termed a key encryption key.

Such an operation enables the secure storage of the data encryption keys in the key cache 221 of the volatile memory 220. The cryptographic processor 126 may be configured with a hierarchy of encryption keys. For example, the AES unit 232 may encrypt data encryption keys with key encryption keys. The AES unit 232 may encrypt the key encryption keys with the root encryption key 241. While in an encrypted form, the data encryption keys and the key encryption keys may be stored in a memory (such as the volatile memory 120, the nonvolatile memory 116) external to the cryptographic processor 126. To ensure security, the root encryption key 241 is not exposed externally to the cryptographic processor 126.

The DES unit 224 may perform a number of different types of encryption and decryption. For example, the DES unit 224 may encipher and decipher 64-bit blocks of data based on a 64-bit key. The MD unit 226 may generate hashes (message digests) based on a number of different standards. For example, the MD unit 226 may generate hashes based on MD-5, MD-4, etc. The MD unit 226 may receive a message block of arbitrary length and generate a 128-bit digest. The MD unit 226 may also perform Keyed-Hash Message Authentication Code (HMAC) operations.

The ALU 222 may perform a number of different arithmetic and logical operations for trust and encryption operations. For example, the ALU 222 may perform addition, subtraction, multiplication, division, bit alignments, shift operations, different logical functions (such as AND, OR, XOR, etc.), etc.

The RNG unit 228 may perform different types of random number generation. The RNG unit 228 may use one or more Linear Feedback Shift Registers (LFSRs) to generate a sequence of random bits. Additionally, the output of the LFSRs may be passed through the SHA unit 230 for additional randomness.

The control register set 208 may store data used to control the cryptographic processor 126. Accordingly, components external to the cryptographic processor 126 may store data into the control register set 208 related to control and configuration of the cryptographic processor 126. The context storage/PCRs 210 may store context and configuration data related to the trusted mobile computing device 100. For example, the context storage/PCRs 210 may store a cryptographic hash from a trusted operation related to authentication of different applications executing on the application processor 106. The status registers 212 may be used to store status regarding given operations within the cryptographic processor 126, status of the different functional units, etc. The intermediate storage 214 may be used to store intermediate results that may be output from one functional unit that is to be inputted into a different functional unit.

The input buffers 218 may store data for which a given operation is performed. For example, if for a given primitive instruction a cryptographic hash is to be performed across the code of an application, the code is stored into the input buffers 218.

As shown, the cryptographic processor 126 includes a number of functional units (including a number of different cryptographic units) and different storage. Additionally, the cryptographic processor 126 may perform a number of different operations, wherein the intermediate results are secure. As further described below, the controller 206 may control the operations of these different functional units and data flow therebetween.

As will be described, the cryptographic processor 126 allows for secure operations by providing atomicity and/or integrity of the operations therein. The atomicity of operations is defined such that an ongoing operation therein may not be preempted and is thus performed to completion. Integrity of operations is defined such that the cryptographic processor 126 provides for opacity of the intermediate data and results. The cryptographic processor 126 serves as the core of the trusted mobile computing device 100 for creating higher-level security services. Such services may include secure storage, trusted execution, acceleration of secure or encrypted communication, random number generation, etc.

The cryptographic processor 126 may operate in both a non-protected mode and a protected mode. In a non-protected mode, the cryptographic processor 126 may operate as a non-secure hardware accelerator for encryption and decryption. For example, the cryptographic processor 126 may receive a request to perform a bulk encryption operation for an application executing on the application processor 106. In a protected mode, the cryptographic processor 126 may perform a number of different secure atomic operations. A more detailed description of these operations is set forth below.

Figure 3:
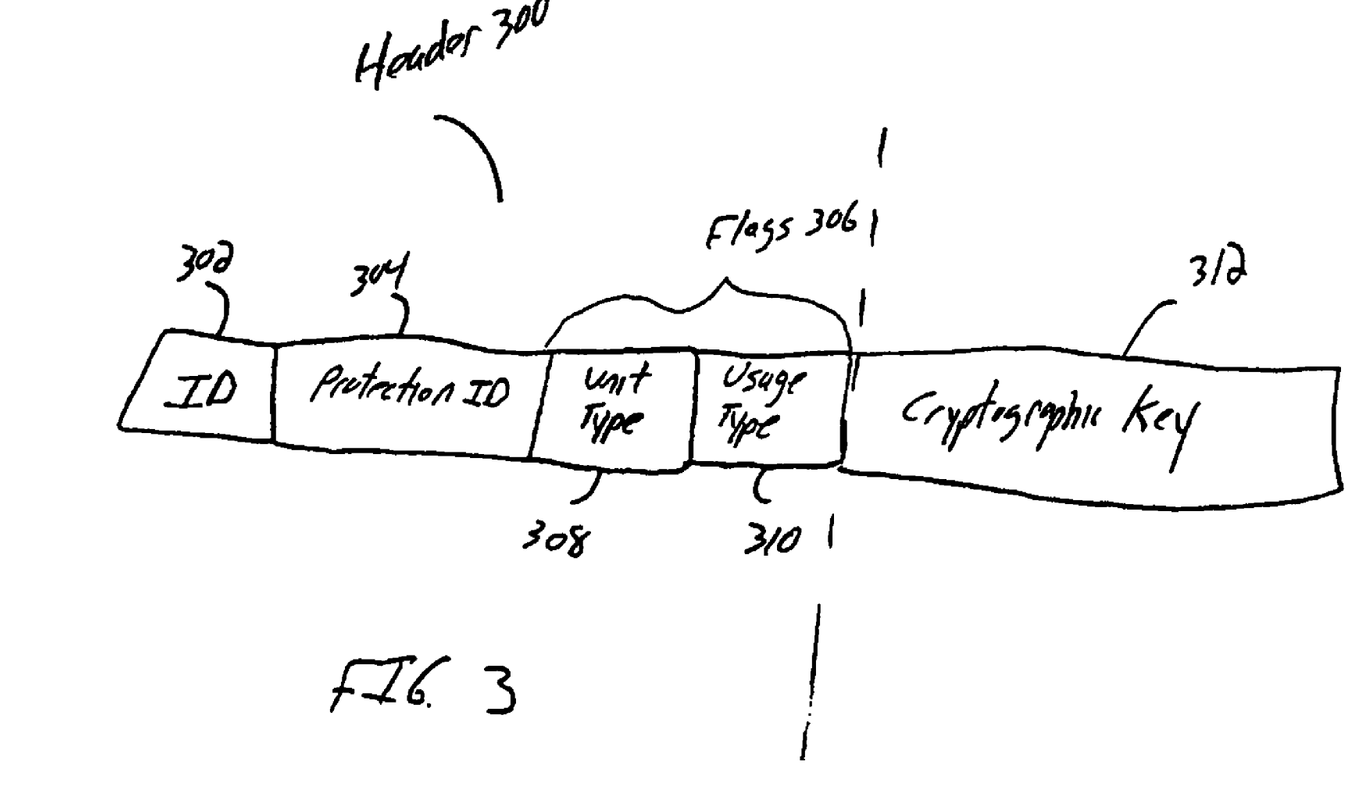
FIG. 3 illustrates an entry in a key cache in a cryptographic processor within a trusted mobile computing device, according to some embodiments of the invention.

FIG. 3 illustrates an entry in a key cache in a cryptographic processor within a trusted mobile computing device, according to some embodiments of the invention. In particular, FIG. 3 illustrates an embodiment of an entry in the key cache 221 of the volatile memory 220. The key cache 221 may include one to a number of entries that include a protected cryptographic key 312 and a header 300. The header provides a number of different identifications as well as restrictions on the usage of the key.

As shown, the header 300 includes an identification 302, a protection identification 304 and a number of flags 306. The flags 306 include a unit type 308 and a usage type 310. The identification 302 may be an alphanumeric value that identifies the protected cryptographic key 312. The different functional units and/or the controller 206 in the cryptographic processor 126 may use the identification 302 to access the protected cryptographic key 312. The protection identification 304 may be an alphanumeric value that identifies the key encryption key used to encrypt this protected cryptographic key 312. If the protected cryptographic key 312 is a data encryption key, the protection identification 304 may be the identification for one of the key encryption keys. If the protected cryptographic key 312 is a key encryption key, the protection identification 304 may be the root encryption key 241.

The unit type 308 identifies one or more of the functional units in the cryptographic processor 126 that may access the protected cryptographic key 312. Accordingly, if a primitive instruction causes the generation of microcode instructions that attempt to have a functional unit access a given protected cryptographic key 312 that is not identified by the unit type 308, the access is denied and the cryptographic processor 126 may return an error to the application requesting such execution. The usage type 310 identifies one or more types of operations that may be performed using the protected cryptographic key 312. The types of operations may include signing, encrypted storage, Attestation Identity Key (AIK) operations, etc.

Figure 4:
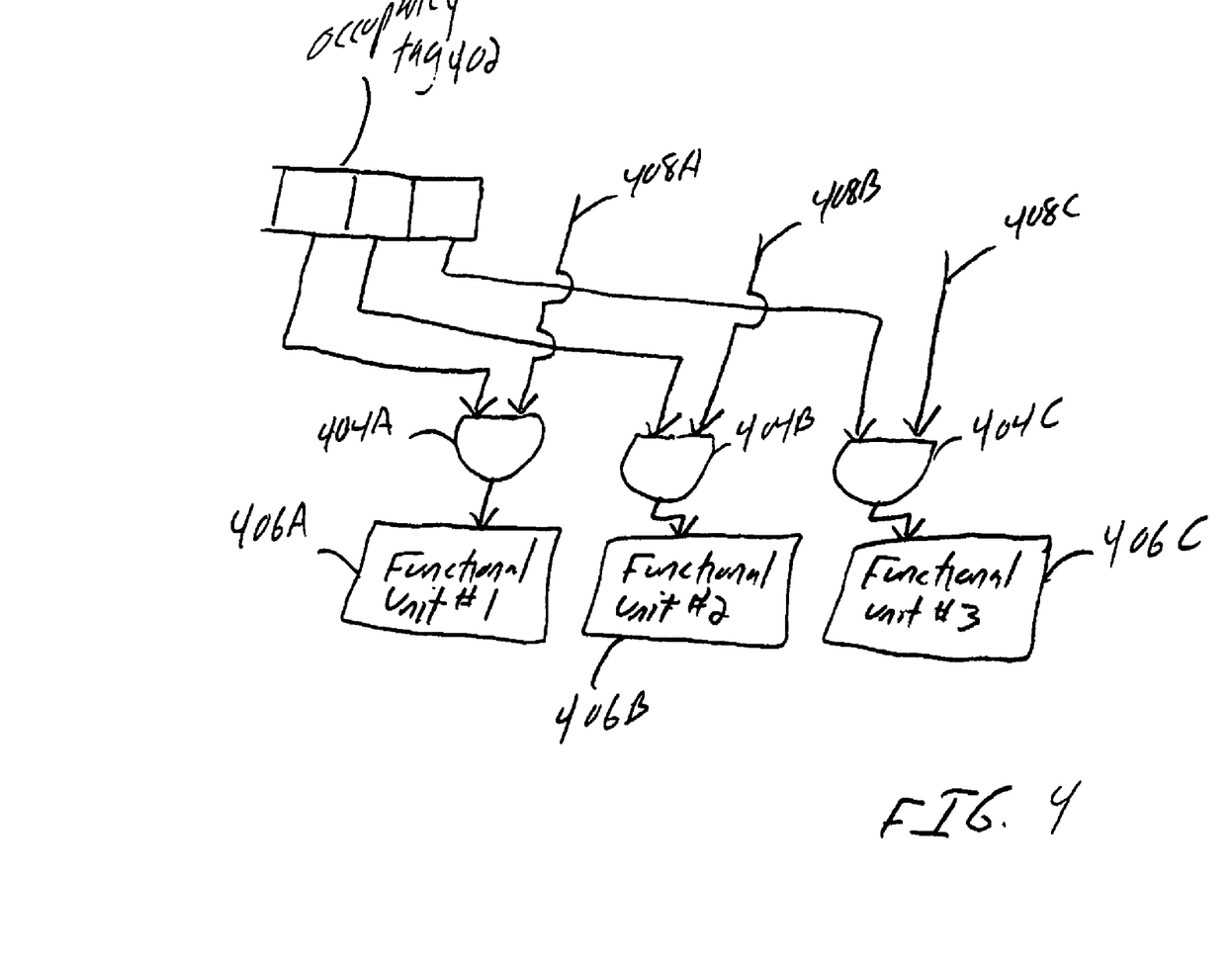
FIG. 4 illustrates a simplified block diagram of parts of a cryptographic processor within a trusted mobile computing device for regulating the power therein, according to some embodiments of the invention.

FIG. 4 illustrates a simplified block diagram of parts of a cryptographic processor within a trusted mobile computing device for regulating the power therein, according to some embodiments of the invention. An occupancy tag 402 may be part of the primitive instruction received into the cryptographic processor 126. In some embodiments, the occupancy tag 402 identifies which of the number of functional units within the cryptographic processor 126 are to perform an operation based on the primitive instruction.

The AND gates 404A-404C may be part of the controller 206. The functional units 406A-406C are representative of the different functional units within the cryptographic processor 126. For example, the functional units 406A-406C may be representative of the ALU 222, the DES unit 224, the MD unit 226, the RNG unit 228, the SHA unit 230, the AES unit 232 or the EAU 234. The controller 206 may include a lesser or greater number of the AND gates 404. For example, the controller 206 may include an AND gate 404 for each of the different functional units 406.

A first input of the AND gate 404A is coupled to receive a first part of the occupancy tag 402. A first input of the AND gate 404B is coupled to receive a second part of the occupancy tag 402. A first input of the AND gate 404C is coupled to receive a third part of the occupancy tag 402. The parts of the occupancy tag 402 may be one or more bits that are indicative of whether a given functional unit is to perform an operation for this primitive instruction.

A second input of the AND gate 404A is coupled to receive a management signal 408A. A second input of the AND gate 404B is coupled to receive a management signal 408B. A second input of the AND gate 404C is coupled to receive a management signal 408C. The management signals 408A-408C may be different types of signals that are to control the power, the clock rate/frequency, etc. of the functional units 406A-406C. For example, the management signals 408A-408C may be an input voltage and/or a clock input.

Accordingly, as described in more detail below, the controller 206 may regulate the power and/or the clock rate/frequency of the different functional units based on whether such units are to perform an operation for the given primitive instruction. For example, the controller 206 may shut off power to those functional units 408A-408C that are not to perform an operation for the given primitive instruction. In some embodiments, the controller 206 may lower the power to those functional units 408A-408C that are not to perform an operation for the given primitive instruction. The controller 206 may turn off the clock signal or lower the clock rate/frequency to those functional units 408A-408C that are not to perform an operation for the given primitive instruction. In some embodiments, the management signals 408 may supply power from the trusted power management unit 166, the non-trusted power management unit 164 or other power source. The operations of the controller 206 with regard to regulating of power, clock rate/frequency, etc. are described in more detail below.

Trusted and Cryptographic Operations

A more detailed description of trusted and cryptographic operations is now described.

Figure 5:
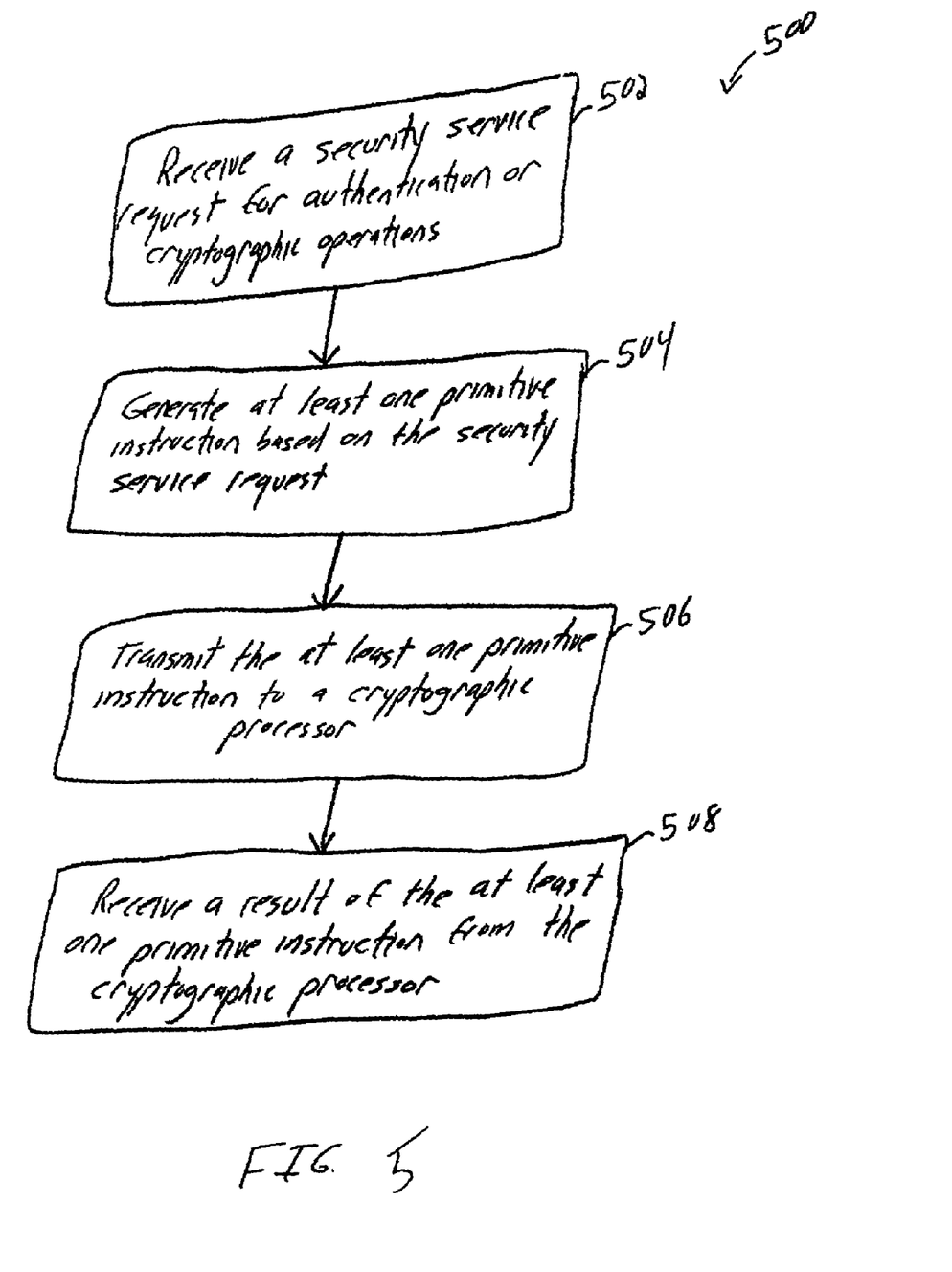
FIG. 5 illustrates a flow diagram for the operations for interfacing with a cryptographic processor, according to some embodiments of the invention.

FIG. 5 illustrates a flow diagram for the operations for interfacing with a cryptographic processor, according to an embodiment of the invention. In particular, FIG. 5 illustrates a flow diagram 500 for the operations of a driver (for the cryptographic processor 126) executing on the application processor 106 for interfacing with the cryptographic processor 126.

In block 502, a security service request for a trusted or cryptographic operation is received. With reference to the embodiment of FIGS. 1A-1B, a driver executing on the application processor 106 receives the security service request for a trusted or cryptographic operation. For example, this driver may receive this security service request from the operating system or other applications executing on the application processor 106. The security service request may be a trusted operation for authenticating an application, hardware, configuration information, etc. The security service request may be for a cryptographic operation (such as hashing, key generation, encryption, decryption, etc.). Control continues at block 504.

In block 504, at least one primitive instruction is generated based on the security service request. With reference to the embodiment of FIG. 1, the driver for the cryptographic processor 126 generates at least one primitive instruction based on the security service request. For example, the security service request may include one to a number of different cryptographic operations. Accordingly, the driver may generate primitive instructions for the different operations. In some embodiments, the driver may include an occupancy tag as part of the primitive instruction. Control continues at block 506.

In block 506, the primitive instruction(s) are transmitted to the cryptographic processor. With reference to the embodiment of FIG. 1, the driver for the cryptographic processor 126 transmits the primitive instruction(s) to the cryptographic processor 126. The driver makes this transmission through the DMA logic 124. Control continues at block 508.

In block 508, a result of the primitive instruction(s) is received from the cryptographic processor. With reference to the embodiment of FIG. 1, the cryptographic processor 126 transmits a result of the primitive instruction(s) back to the driver for the cryptographic processor 126 through the output buffers 216 (using the DMA interface 202). For example, if the primitive instruction relates to a trusted operation for authentication of a given application, the result may be a Boolean value indicative as to whether the application is authentic. In another example, if the primitive instruction is a request for a decryption operation, the result may be a Boolean value indicative as to whether the decryption operation is successful and where the results of such decryption are stored or the results of such decryption. In a different example, if the primitive instruction is a request for a random number, the result may include the random number.

A more detailed description of the processing of a primitive instruction by the cryptographic processor 126 is now described.

Figure 6:
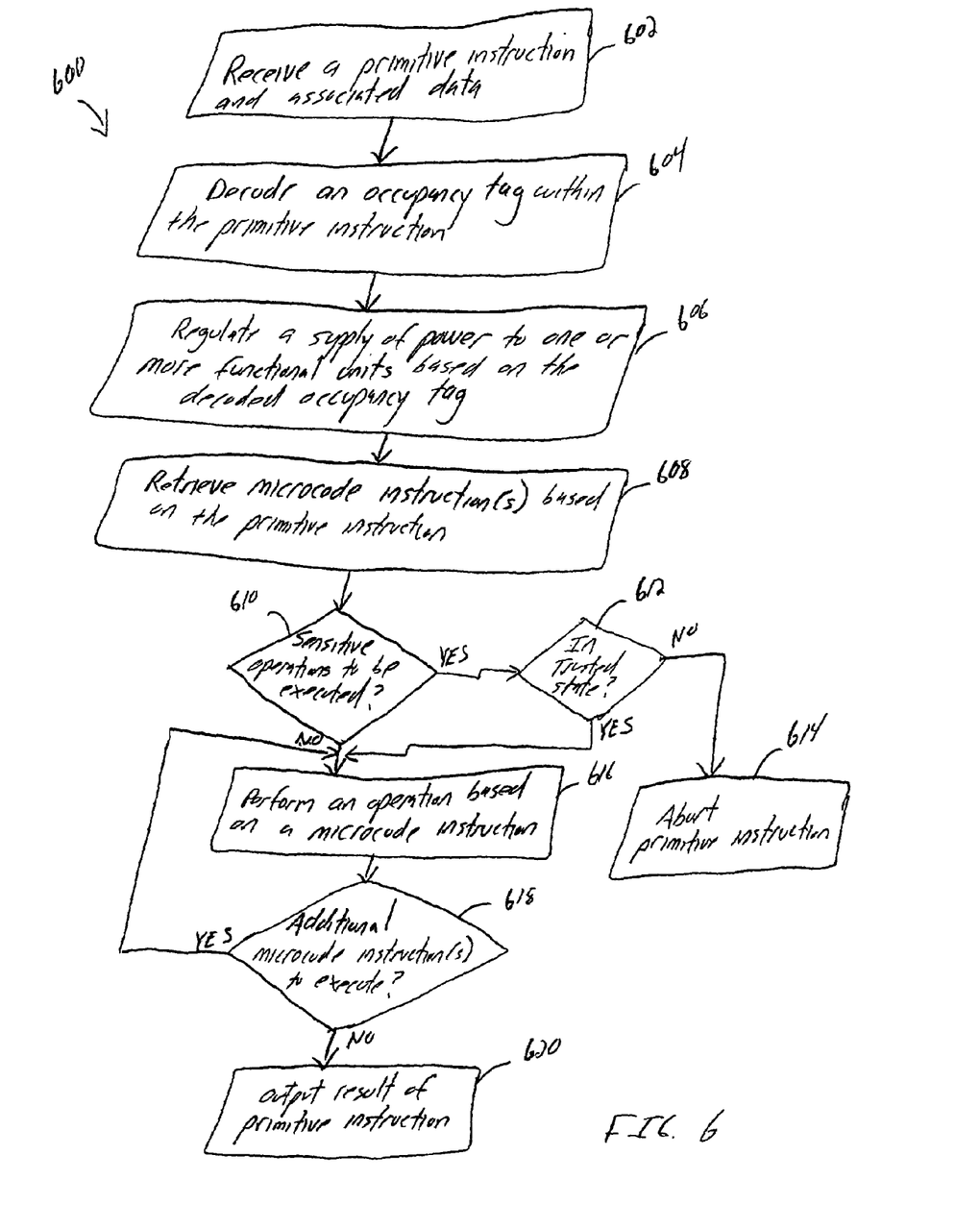
FIG. 6 illustrates a flow diagram for secured operations within a cryptographic processor, according to some embodiments of the invention.

FIG. 6 illustrates a flow diagram for secured operations within a cryptographic processor, according to an embodiment of the invention.

In block 602 of the flow diagram 600, a primitive instruction and/or the associated data are received. With reference to the embodiments of FIGS. 1A-1B, the cryptographic processor 126 receives a primitive instruction from the driver for the cryptographic processor 126 (executing on the application processor 106). As described above, such primitive instructions may be for different types of secured operations, such as a trusted operation, cryptographic operation, etc. With reference to the embodiment of FIG. 2, the cryptographic processor 126 receives the primitive instruction through the DMA interface 202 and stores such instruction into the instruction sequence buffer 204.

Additionally, the cryptographic processor 126 may receive associated data for the primitive instruction for a number of such instructions. With reference to the embodiment of FIG. 2, the cryptographic processor 126 receives the associated data through the DMA interface 202 into the input buffers 218. For example, if the primitive instructions relates to a trusted operation to authenticate an application (e.g., the operating system for the application processor 106) to be executed in the application processor 106, the associated data is the code for the application that is retrieved from the nonvolatile memory 116.

To further illustrate, the cryptographic processor 126 may be used to encrypt data that is confidential or needed to be protected from modification. Accordingly, such operations can be used by the trusted mobile computing device 100 to protect files from being modified or viewed by other applications or uses of the trusted mobile computing device 100. Moreover, the cryptographic processor 126 may be used in a trusted mobile computing device 100 that is part of the Digital Rights movement to protect content and digital rights (permissions) objects. Therefore, the cryptographic processor 126 may be used to decrypt a Moving Picture Expert Group (MPEG) Audio Layer 3 (MP3) file that has been digitally protected in accordance with the Digital Rights movement.

Another example of such data may include data for a bulk decryption operation, wherein the data is received into the trusted mobile computing device 100 from a remote device (such as a different mobile device, server, etc.). The associated data may include the data to be decrypted along with the public key that is used to perform the decryption operation.

The cryptographic processor 126 may receive the associated data for the primitive instruction through a public interface of the nonvolatile memory 116 and/or the volatile memory 120. Returning to the flow diagram 600, control continues at block 604.

In block 604, an occupancy tag within the primitive instruction is decoded. With reference to the embodiments of FIGS. 1A-1B and 4, the controller 206 may decode the occupancy tag. The AND gates 404 in the controller 206 may receive the different parts of the occupancy tag 402 and decode such parts. For example, the AND gate 404A may decode a first bit in the occupancy tag 402. If such bit is a logical high value, the AND gate 404A may output the value of the management signal 408A. Accordingly, if the management signal 408A is to supply power to the functional unit 406A, such power is supplied if the bit in the occupancy tag 402 is a logical high value. If the management signal 408A is to supply a clock signal to the functional unit 406A, this clock signal is inputted into the functional unit 406A if the bit in the occupancy tag 402 is a logical high value. In some embodiments, the controller 206. Control continues at block 606.

In block 606, a supply of power to one or more functional units is regulated based on the decoded occupancy tag. With reference to the embodiments of FIGS. 1A-1B and 4, the controller 206 may regulate this supply of power. As described above, the AND gates 404 may regulate the power based on the decoded occupancy tag to regulate the inputting of the management signals 408. Such management signals 408 may be a supply of power, a voltage input, a clock signal, etc.

In some embodiments, if the management signal 408 includes power, the controller 206 may regulate this supply of power by shutting off power to those functional units that are not to perform an operation as part of the execution of the primitive instruction. The controller 206 may also regulate this supply of power by lowering the power supplied to those functional units that are not to perform an operation as part of the execution of the primitive instruction. If the management signal 408 includes a clock signal, the controller 206 may also regulate this supply of power by not inputting the clock signal into the functional unit. The controller 206 may also regulate this supply of power by not lowering the clock speed of the clock signal being inputted into the functional unit. In some embodiments, the controller 206 may lower the power and/or the clock speed by transmitting a control signal to the trusted power management unit 166. The trusted power management unit 166 may then lower the power and/or the clock speed being inputted into the cryptographic processor 126.

As described, embodiments may provide a significant savings of power. Such power savings may be increased in an architecture that includes orthogonality of the primitive instructions (e.g., a primitive instruction typically using a small number of functional units). Additionally, embodiments may provide a significant power savings in an architecture that includes functional units that are, in general, decoupled from each other. Control continues at block 608.

In block 608, the microcode instruction(s) for the primitive instruction are retrieved. With reference to the embodiments of FIGS. 1A-1B, the controller 206 retrieves the microcode instruction(s) for the primitive instruction from the microcode memory 240. A given primitive instruction may include one to a number of different microcode instructions. For example, if the primitive instruction is to authenticate an application based on a comparison of a signed credential of the application to a cryptographic hash, the microcode instructions may include an instruction to retrieve the signed credential from the nonvolatile memory 116. Another microcode instruction may include the retrieval of an encryption key from the nonvolatile memory 116 that is used for cryptographic hash. Another microcode instruction may include a move operation of the encryption key to the SHA unit 230, while a different microcode instruction may instruct the SHA unit 230 to perform the cryptographic hash. Another microcode instruction may include a move operation of the result of the cryptographic hash and the signed credential to the ALU 22, while a different microcode instruction may instruct the ALU 222 to perform a comparison of these two values. Another microcode instruction may cause the result of the comparison operation to be stored into the output buffers 216 (which is transmitted back to the application processor 106).

As described, a given primitive instruction may include a series of microcode instructions. Accordingly, the intermediate results for a given primitive instruction are opaque to components that are external to the cryptographic processor 126. Returning to the flow diagram 600, control continues at block 610.

In block 610, a determination is made as to whether sensitive operation(s) are performed within the cryptographic processor based on the microcode instruction(s) for this primitive instruction. With reference to the embodiments of FIGS. 1A-1B, the controller 206 makes this determination. Examples of sensitive operation(s) may include any operation that uses the root encryption key 241, that uses any of the protected keys (in the key cache 221) and/or that accesses the counter 215 or any of the platform configuration registers 210. After determining that sensitive operation(s) are not performed within the cryptographic processor 126 based on the microcode instruction(s) for this primitive instruction, control continues at block 616, which is described in more detail below.

In block 612, after determining that sensitive operation(s) are performed within the cryptographic processor 126 based on the microcode instruction(s) for this primitive instruction, a determination is made as to whether the cryptographic processor is in a trusted state. With reference to the embodiment of FIG. 2, the controller 206 makes this determination. In an embodiment, the cryptographic processor 126 may not be in a trusted state if the cryptographic processor 126 is not properly initialized. The cryptographic processor 126 may not be in a trusted state if an illegal operation had been performed. An example of an illegal operation may be when data is attempted to be improperly moved from one location to a second location (as described herein with regard to the restrictions of data movement). The cryptographic processor 126 may also not be in a trusted state if authentication fails, or if a key is not properly loaded into a cryptographic unit, or if parameters associated with a primitive instruction are not within the proper range, etc. Authentication is used during loading keys, and comprises an HMAC-SHA calculation using a password and two random numbers, one random-generated by the cryptographic processor 126 and the other generated by the application or user. The HMAC calculation may also include values from the primitive instruction or attributes of the key to be loaded.

In some embodiments, an application that wishes to load a cryptographic key into one of the functional units of the cryptographic processor 126 for execution calculates the HMAC using the password for the key. The application may have prior knowledge of the password. For example, when the key was created, the application may set the password. The application may provide the expected result of the HMAC calculation as a parameter for the primitive instruction. The cryptographic processor 126 also generates the HMAC calculation and compares its result to the expected result parameter on the primitive instruction. If the two results match, then authentication is successful, and the key is loaded. If the results do not match, then authentication fails, and the key is not loaded.

In block 614, the primitive instruction is aborted. With reference to the embodiment of FIG. 2, the controller 206 aborts this primitive instruction. The controller 206 terminates any additional microcode instructions and may also send a fail notification to the driver executing on the application processor 106.

In block 616, after determining that the cryptographic processor 126 is in a trusted state or that a sensitive operation is not to be performed, an operation associated with the primitive instruction is performed. With reference to the embodiment of FIG. 2, the controller 206 controls the order of execution of the different operations based on the microcode operations. Therefore, the controller 206 may transmit a control instruction for execution to the appropriate functional unit within the cryptographic processor 126, the nonvolatile memory controller 114 or the volatile memory controller 118. The appropriate functional unit within the cryptographic processor 126, the nonvolatile memory controller 114 or the volatile memory controller 118 performs the operation. With regard to accessing the nonvolatile memory 116 and the volatile memory 120 during execution of the primitive instruction, the cryptographic processor 126 may perform such access through the private interface for the nonvolatile memory 116 and the volatile memory 120. For example, assume that an encrypted data encrypted key, which is stored in the volatile memory 120, is to be used for a cryptographic operation for a primitive instruction. The controller 206 may retrieve this encrypted data encryption key through the private interface for the volatile memory 120. Additionally, other examples of operations associated with the primitive instruction are illustrated in the description for the block 608 (set forth above).

The controller 206 may move data among the different functional units. However, the cryptographic processor 126 may be configured with one or more data-moving restrictions. Such restrictions ensure that a rogue process cannot surreptitiously read any sensitive information out from the cryptographic processor 126. Such restrictions may be stored in the microcode memory 240. For example, one data restriction precludes data stored in the key storage 220 from being written to the output buffers 216. Such a restriction prevents an encryption key from being read out from the cryptographic processor 126 in an unencrypted format.

Another example restriction may preclude data stored in the input buffers 218 from being written to the context storage/PCRs 210. Such a restriction prevents an overwrite of the platform configuration for the cryptographic processor 126. Another example restriction may preclude data stored in the input buffers 218 from being written to the key cache 221. Such a restriction prevents an overwrite of the encryption keys stored therein. Returning to the flow diagram 600, control continues at block 618.

In block 618, a determination is made as to whether additional microcode instructions are to be executed. With reference to the embodiment of FIG. 2, the controller 206 makes this determination. As described above, the controller 206 retrieves one to a number of microcode instructions for a given primitive instruction from the microcode memory 240. Therefore, the controller 206 determines whether these different instructions have been executed. After determining that additional microcode instructions are to be executed for a given primitive instruction, control continues at block 616, wherein a different microcode instruction is executed.

In block 620, upon determining that additional microcode instructions are not to be executed for a given primitive instruction, the result of the primitive instruction is outputted. With reference to the embodiment of FIG. 2, the controller 206 may output the result through the output buffers 216 to the application processor 106. Additionally, the microcode may execute clean-up operations to ensure the cryptographic processor 126 stays in a trusted state. Clean-up operations may include removing keys from functional units that were used during the operation, overwriting intermediate results in intermediate storage 214 with zeros or ones, resetting state flags in the cryptographic processor 126 to indicate an operation is complete or keys are no longer available, etc.

The operations of the flow diagrams 500 and 600 may be used for a number of different trusted and cryptographic operations. One such example involves the write access to the nonvolatile memory 116. The nonvolatile memory 116 may be divided into a number of different blocks. For example, if the size of the nonvolatile memory 116 is eight megabytes, the nonvolatile memory 116 may include eight one-megabyte blocks. The number of different blocks may have an associated enable to control write access thereto. The cryptographic processor 126 may allow for the assertion of the enable for a given block after the data to be stored therein has been authenticated. Accordingly, the driver for the cryptographic processor 126 receives a security service request for a write access to a given block in the nonvolatile memory 116. The driver then generates a primitive instruction that requests authentication of the data to be stored in the block. The primitive instruction along with a signed credential and the data are transmitted to the cryptographic processor 126. The cryptographic processor 126 may then execute a number of different microcode instructions to generate a cryptographic hash across the data that is compared to the signed credential. The cryptographic processor 126 may authenticate the data based on the comparison. Such an example may be used for authenticating a new patch for a given application that is downloaded into trusted mobile computing device 100.

As described, embodiments of the invention provide an appropriate temporal and spatial granularity of control with regard to power management of the cryptographic processor 126. With regard to temporal granularity, the power management may be for each primitive instruction received. With regard to spatial granularity, the power management may be for individual functional units within the cryptographic processor 126.

Additionally, as described, embodiments of the invention may perform both trusted operations and cryptographic operations within a same processor that is within an executable context that is independent of the executable context for the application processor within a trusted mobile computing device. Therefore, this cryptographic processor may be used to perform trusted operations (such as trusted boot operations to authenticate the operating system for the application processor), while also using the same functional units to perform different types of cryptographic operations subsequent to the trusted boot operations.

Moreover, as described, the cryptographic processor 126 may ensure that the trust-related encryption keys are not exposed (unencrypted) externally. The cryptographic processor 126 may ensure that intermediate, partial results of cryptographic operations are also not exposed externally. Further, the cryptographic processor 126 may ensure that once initiated, a cryptographic operation is not modified or tampered with from components external thereto.

System Operating Environment

In this section, a system overview is presented. The system overview presents a network configuration used in conjunction with embodiments of the invention. The system overview also presents the general functionality of the network configuration.

Figure 7:
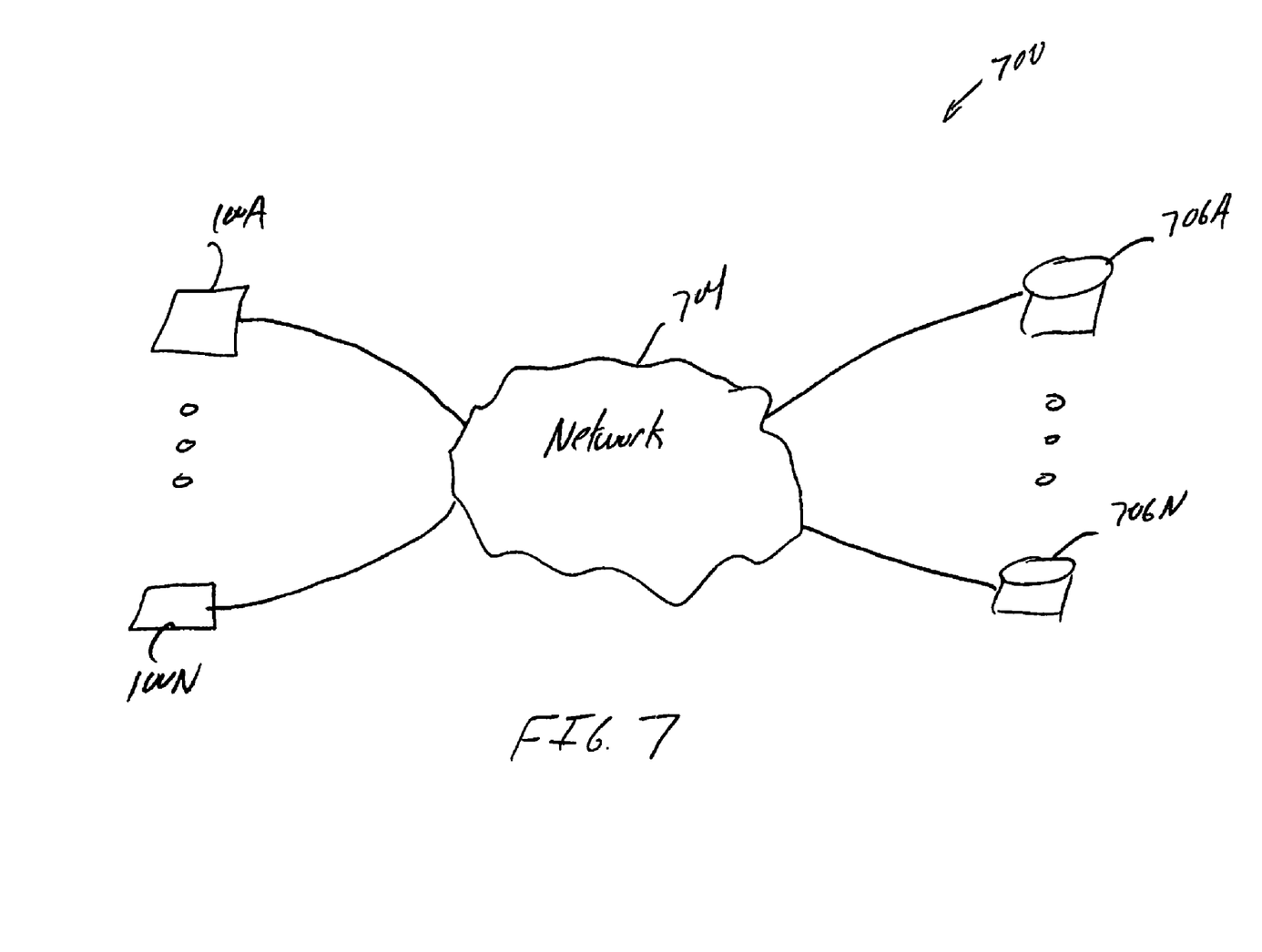
FIG. 7 illustrates a simplified functional block diagram of a system configuration wherein a trusted mobile communications device having cryptographic operations may operate, according to some embodiments of the invention.

FIG. 7 illustrates a simplified functional block diagram of a system configuration wherein a trusted mobile communications device having cryptographic operations may operate, according to an embodiment of the invention. FIG. 7 illustrates a system 700 that includes a number of trusted mobile computing devices 100A-100N and a number of servers 706A-706N that are coupled together through a network 704. The network 704 may be a wide area network, a local area network or a combination of different networks that provide communication between the number of trusted mobile computing devices 100A-100N and the number of servers 706A-706N. For example, the number of trusted mobile computing devices 100A-100N may be different types of wireless computing devices, wherein a part of the network 704 is configured to process wireless communications, while a different part of the network 704 may be configured to process wired communications for communications with the number of servers 706A-706N.

The number of trusted mobile computing devices 100A-100N may perform a number of different trusted and crypto-graphic operations as described above. For example, users of the number of trusted mobile computing devices 100A-100N may perform different electronic commerce transactions with different applications executing on the number of servers 706A-706N.

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the embodiments of the invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions, will be able to implement appropriate functionality without undue experimentation.

It should be noted that the individual activities shown in the flow diagrams do not have to be performed in the order illustrated or in any particular order. Moreover, various activities described with respect to the methods identified herein can be executed in serial or parallel fashion. Some activities may be repeated indefinitely, and others may occur only once. Various embodiments may have more or fewer activities than those illustrated.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Embodiments of the invention include features, methods or processes that may be embodied within machine-executable instructions provided by a machine-readable medium. A machine-readable medium includes any mechanism that provides (i.e., stores and/or transmits) information in a form accessible by a machine (e.g., a computer, a network device, a personal digital assistant, manufacturing tool, any device with a set of one or more processors, etc.). In an exemplary embodiment, a machine-readable medium includes volatile and/or non-volatile media (e.g., read only memory (ROM), random access memory (RAM), magnetic disk storage media, optical storage media, flash memory devices, etc.).

Such instructions are utilized to cause a general or special purpose processor, programmed with the instructions, to perform methods or processes of the embodiments of the invention. Alternatively, the features or operations of embodiments of the invention are performed by specific hardware components that contain hard-wired logic for performing the operations, or by any combination of programmed data processing components and specific hardware components. Embodiments of the invention include software, data processing hardware, data processing system-implemented methods, and various processing operations, further described herein.

A number of figures show block diagrams of systems and apparatus for a trusted mobile platform architecture, in accordance with embodiments of the invention. A number of figures show flow diagrams illustrating operations for a trusted mobile platform architecture, in accordance with embodiments of the invention. The operations of the flow diagrams have been described with reference to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

In view of the wide variety of permutations to the embodiments described herein, this detailed description is intended to be illustrative only, and should not be taken as limiting the scope of embodiments of the invention. To illustrate, although described with reference to trusted and encryption operations while the trusted mobile computing device 100 is in actual operation by a user of such device, embodiments of the invention are not so limited. For example, the cryptographic processor 126 may be used to authenticate a device during a debug operation of the trusted mobile computing device 100. Returning to FIG. 1 to illustrate, a device may be coupled to the cryptographic processor 126 through the JTAG interface 155 for debugging. Accordingly, the cryptographic processor 126 may authenticate this device through a challenge/response operation. The cryptographic processor 126 may generate a challenge that is transmitted to the device coupled to the JTAG interface 155. Such device then generates a response to the challenge. Therefore, if the cryptographic processor 126 authenticates this device based on the response, the device is able to perform communications with the trusted mobile computing device 100 through the JTAG interface 155.

To further illustrate a permutation of embodiments of the invention, although described such that primitive instructions are executed serially within the cryptographic processor 126, in an embodiment, a number of different microcode operations for different primitive instructions may be executing at least simultaneously in part therein. What are claimed as the embodiments of the invention, therefore, is all such modifications as may come within the scope and available equivalents of the following claims and equivalents thereto. Therefore, the specification and drawings are to be regarded in an illustrative rather than a restrictive sense.

What is claimed is:

1. A method comprising:
receiving a primitive instruction into a trusted cryptographic processor; and
regulating power to one or more functional units within the trusted cryptographic processor using power from a power management unit that is controlled by the trusted cryptographic processor, wherein the regulating is based on an identification of which of the one or more functional units are to execute a cryptographic operation based on the primitive instruction, wherein regulating power to the one or more functional units comprises decoding an occupancy tag within the primitive instruction, wherein the occupancy tag identifies at least one of the one or more functional units to execute a cryptographic operation, and
wherein regulating power to the one or more functional units comprises regulating a clock speed of the one or more functional units.

2. The method of claim 1, wherein regulating power to one or more functional units within the trusted cryptographic processor using power from the power management unit that is controlled by the trusted cryptographic processor comprises regulating power to one or more functional units within the trusted cryptographic processor, independent of a different processor that is fabricated on a same substrate as the trusted cryptographic processor.

3. The method of claim 1, further comprising regulating power to the trusted cryptographic processor based on control from the trusted cryptographic processor, independent of the processor that is not in the trusted state.

4. The method of claim 3, wherein regulating power to the trusted cryptographic processor based on control from the trusted cryptographic processor, independent of the processor that is not in the trusted state comprises reducing power to the trusted cryptographic processor after a predetermined period of inactivity by the trusted cryptographic processor.

5. The method of claim 1, wherein regulating power to the one or more functional units comprises reducing a supply of power to at least one of the one or more functional units that are not to execute a cryptographic operation based on the primitive instruction.

6. The method of claim 1, wherein regulating a clock speed of the one or more functional units comprises reducing the clock speed of at least one of the one or more functional units that are not to execute a cryptographic operation based on the primitive instruction.

7. An apparatus comprising:
a trusted cryptographic processor that includes:
at least one functional unit; and
a controller to receive a primitive instruction that identifies which of the at least one functional unit is to perform an operation, wherein the controller is to reduce power to the at least one functional unit that is not identified by the primitive instruction, wherein the controller is to reduce power to the at least one functional unit that is not identified by the primitive instruction based on a reduction of a clock speed of the at least one functional unit; and
a trusted power management unit to supply the power based on control from the controller, wherein the control is independent of a processor that is not in a trusted state.

8. The apparatus of claim 7, wherein the controller is to reduce the power to the trusted cryptographic processor after a predetermined period of inactivity by the trusted cryptographic processor.

9. A system comprising
a dipole antenna to receive a communication;
an application processor that is fabricated on a substrate, the application processor to generate a primitive instruction; and
a cryptographic processor that is fabricated on the substrate, wherein the cryptographic processor comprises one or more functional units to execute a cryptographic operation based on the primitive instruction; and
a power management unit to supply power to the cryptographic processor based on control by the cryptographic processor, independent from control by the application processor, wherein the cryptographic processor further comprises a controller that is to regulate the power to the one or more functional units based on an identification of which of the one or more functional units are to execute a cryptographic operation based on the primitive instruction, and wherein the controller is to regulate a clock speed of the one or more functional units based on an identification of which of the one or more functional units are to execute a cryptographic operation based on the primitive instruction.

10. The system of claim 9, wherein the controller is to reduce power to the cryptographic processor after a predetermined period of inactivity by the cryptographic processor.

11. The system of claim 9, wherein the controller is to reduce power to at least one of the one or more functional units that are not to execute a cryptographic operation based on the primitive instruction.

12. The system of claim 9, wherein the controller is to reduce the clock speed of at least one of the one or more functional units that are not to execute a cryptographic operation based on the primitive instruction.

13. A system comprising
an application processor that is fabricated on a substrate, the application processor to generate a primitive instruction;
a trusted cryptographic processor that is fabricated on the substrate, wherein the trusted cryptographic processor comprises one or more cryptographic units to execute a cryptographic operation based on the primitive instruction; and
an untrusted power management unit to supply power to the application processor; and
a trusted power management unit to supply power to the trusted cryptographic processor based on control by a controller within the trusted cryptographic processor, wherein the control is independent of the application processor, wherein the controller is to regulate a clock speed of the one or more cryptographic units based on an identification of which of the one or more functional units are to execute a cryptographic operation based on the primitive instruction.

14. The system of claim 13, wherein the controller is to regulate the power to the one or more functional units based on an identification of which of the one or more cryptographic units are to execute a cryptographic operation based on the primitive instruction.

15. The system of claim 13, wherein the controller is to reduce the power to the trusted cryptographic processor after a predetermined period of inactivity by the trusted cryptographic processor.

16. The system of claim 13, wherein the controller is to reduce power to at least one of the one or more cryptographic units that are not to execute a cryptographic operation based on the primitive instruction.

17. A machine-readable medium that provides instructions, which when executed by a machine, cause said machine to perform operations comprising:
receiving a primitive instruction into a trusted cryptographic processor; and
regulating power to one or more functional units within the trusted cryptographic processor using power from a power management unit that is controlled by the trusted cryptographic processor, wherein the regulating is based on an identification of which of the one or more functional units are to execute a cryptographic operation based on the primitive instruction, wherein regulating power to the one or more functional units comprises regulating a clock speed of the one or more functional units, and wherein regulating power to the one or more functional units comprises decoding an occupancy tag within the primitive instruction, wherein the occupancy tag identifies at least one of the one or more functional units to execute a cryptographic operation.

18. The machine-readable medium of claim 17, wherein regulating power to one or more functional units within the trusted cryptographic processor using power from the power management unit that is controlled by the trusted cryptographic processor comprises regulating power to one or more functional units within the trusted cryptographic processor, independent of a different processor that is fabricated on a substrate that includes the trusted cryptographic processor.

19. The machine-readable medium of claim 17, further comprising regulating power to the trusted cryptographic processor based on control from the trusted cryptographic processor, independent of the processor that is not in the trusted state.

20. The machine-readable medium of claim 19, wherein regulating power to the trusted cryptographic processor based on control from the trusted cryptographic processor, independent of the processor that is not in the trusted state comprises reducing power to the trusted cryptographic processor after a predetermined period of inactivity by the trusted cryptographic processor.

21. The machine-readable medium of claim 17, wherein regulating power to the one or more functional units comprises reducing a supply of power to at least one of the one or more functional units that are not to execute a cryptographic operation based on the primitive instruction.

22. The machine-readable medium of claim 17, wherein regulating a clock speed of the one or more functional units comprises reducing the clock speed of at least one of the one or more functional units that are not to execute a cryptographic operation based on the primitive instruction.

* * * * *

UNITED STATES PATENT AND TRADEMARK OFFICE
CERTIFICATE OF CORRECTION

PATENT NO. : 7,636,858 B2  Page 1 of 1
APPLICATION NO. : 10/881005
DATED : December 22, 2009
INVENTOR(S) : Khan et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1485 days.

Signed and Sealed this

Twenty-first Day of December, 2010

David J. Kappos
*Director of the United States Patent and Trademark Office*